United States Patent
Wilkins et al.

(10) Patent No.: US 9,405,828 B2
(45) Date of Patent: Aug. 2, 2016

(54) SYSTEM AND METHOD FOR PHONETIC SEARCHING OF DATA

(75) Inventors: Malcolm Fintan Wilkins, Hereford (GB); Gareth Alan Wynn, Malvern (GB)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 13/605,055

(22) Filed: Sep. 6, 2012

(65) Prior Publication Data

US 2014/0067820 A1    Mar. 6, 2014

(51) Int. Cl.
*G06F 17/30* (2006.01)

(52) U.S. Cl.
CPC .... *G06F 17/30778* (2013.01); *G06F 17/30194* (2013.01)

(58) Field of Classification Search
CPC ................. G06F 17/30; G06F 17/00
See application file for complete search history.

(56) References Cited

U.S. PATENT DOCUMENTS

| | | | | |
|---|---|---|---|---|
| 6,868,380 B2 * | 3/2005 | Kroeker | ................. | G06Q 30/02 704/236 |
| 7,177,795 B1 * | 2/2007 | Chen | ................... | G10L 15/1815 704/1 |
| 7,567,896 B2 * | 7/2009 | Coorman | ................ | G10L 13/07 704/10 |
| 7,725,318 B2 * | 5/2010 | Gavalda | ............ | G06F 17/30684 704/245 |
| 7,809,568 B2 * | 10/2010 | Acero | ............... | G06F 17/30746 704/257 |
| 2002/0095404 A1 | 7/2002 | Davies et al. | | |
| 2004/0186722 A1 | 9/2004 | Garber et al. | | |
| 2005/0182629 A1 * | 8/2005 | Coorman | ................ | G10L 13/07 704/266 |
| 2006/0074898 A1 * | 4/2006 | Gavalda | ............ | G06F 17/30684 |
| 2007/0106509 A1 * | 5/2007 | Acero | ............... | G06F 17/30746 704/240 |
| 2008/0033986 A1 * | 2/2008 | McCusker | ........ | G06F 17/30746 |
| 2008/0071542 A1 * | 3/2008 | Yu | .................. | 704/270 |
| 2009/0157385 A1 | 6/2009 | Tian | | |
| 2009/0326947 A1 | 12/2009 | Arnold et al. | | |
| 2010/0211569 A1 | 8/2010 | Erhart et al. | | |
| 2011/0270606 A1 * | 11/2011 | Crochet | ............. | G06F 17/2211 704/9 |
| 2011/0270888 A1 * | 11/2011 | Crochet | ............. | G06F 17/2211 707/794 |
| 2011/0271232 A1 * | 11/2011 | Crochet | ............. | G06F 17/2211 715/810 |
| 2012/0185473 A1 | 7/2012 | Ponting et al. | | |
| 2012/0254149 A1 * | 10/2012 | Ramsay | ............ | G06Q 30/0256 707/709 |

(Continued)

OTHER PUBLICATIONS

Yang, Hung-chih; Dasdan, Ali, et al., "Map-Reduce-Merge: Simplified Relational Data Processing on Large Clusters," Jun. 12-14, 2007, ACM SIGMOD '07, pp. 1029-1040.*

(Continued)

*Primary Examiner* — Farhan Syed

(57) ABSTRACT

A method of phonetically searching media information comprises receiving a plurality of search queries from one or more client systems and providing a phonetic representation of each search query. One or more search jobs are instantiated, each search job comprising a plurality of tasks, each task being arranged to sequentially read a block from an archive file. The archive file is stored within a distributed filing system (DFS) in which sequential blocks of data comprising the archive file are replicated to be locally available to one or more processors from a cluster of processors for executing the tasks. Each block stores index files corresponding to a plurality of source media files, each index file containing a phonetic stream corresponding to audio information for a given source media file. Each task obtains phonetic representations of outstanding search queries for a block and sequentially searches the block for each outstanding search query.

16 Claims, 3 Drawing Sheets

(56) References Cited

U.S. PATENT DOCUMENTS

2013/0110961 A1* 5/2013 Jadhav .................. G06F 15/167
709/213
2014/0067374 A1 3/2014 Wilkins et al.

OTHER PUBLICATIONS

Jaffe, Elliot and Kirpatrick, Scott, "Architecture of the Internet Archive," May 4-6, 2009, ACM SYSTOR '09, pp. 1-10.*
Shvachko, Konstantin, et al, "The Hadoop Distributed File System," IEEE 26th Symposium on Mass Storage Systems and Technologies, May 3-7, 2010, pp. 1-10.*
McCreadie, Richard, et al., "MapReduce indexing strategies: Studying scalability and efficiency," Feb. 11, 2010, Informaiton Processing and Management, vol. 48, pp. 873-888.*
Liao, Haojun, Jizhong Han, and Jinyun Fang. "Multi-dimensional index on hadoop distributed file system." In Networking, Architecture and Storage (NAS), 2010 IEEE Fifth International Conference on, pp. 240-249. IEEE, 2010.*
Huang, Dachuan, Xuanhua Shi, Shadi Ibrahim, Lu Lu, Hongzhang Liu, Song Wu, and Hai Jin. "MR-scope: a real-time tracing tool for MapReduce." In Proceedings of the 19th ACM International Symposium on High Performance Distributed Computing, pp. 849-855. ACM, 2010.*
Floratou, Avrilia, Jignesh M. Patel, Eugene J. Shekita, and Sandeep Tata. "Column-oriented storage techniques for MapReduce." Proceedings of the VLDB Endowment 4, No. 7 (2011): 419-429.*
White, Tom, "Hadoop: The Definitive Guide, 2nd Edition," Oct. 2010, O'Reilly Media Group, pp. i-601 (625 total pages).*
Cerisara, "Automatic Discovery of Topics and Acoustic Morphemes from Speech," Elsevier, Apr. 2009, vol. 23, D Issue 2, 10 pages.
Hazen et al., "Topic Identification from Audio Recordings Using Word and Phone Recognition Lattices," MIT Lincoln Laboratory, 2007, 6 pages.
Jourlin et al., "General query expansion techniques for spoken document retrieval," ESCA Tutorial and Research Workshop Accessing Information in Spoken Audio, Cambridge, UK, Apr. 1999 pp. 8-13.
Kohlschutter, "Boilerplate detection using shallow text features." WSDM 2010: pp. 441-450.
Deschacht et al., "The latent words language model," ACM vol. 26 Issue 5, Oct. 2012, pp. 384-409.
Wright et al. "Improved topic spotting through statistical modelling of keyword dependencies," IEEE ICASSP, vol. 1, IEEE, Detroit, 1995, pp. 313-316.
Kazeminezhad, Farzad; Office Action; U.S. Appl. No. 13/605,084; May 30, 2014; United States Patent and Trademark Office; Alexandria, Virginia.
Kazeminezhad, Farzad; Office Action; U.S. Appl. No. 13/605,084; Nov. 19, 2014; United States Patent and Trademark Office; Alexandria, Virginia.
Kazeminezhad, Farzad; Advisory Action; U.S. Appl. No. 13/605,084; Feb. 4, 2015; United States Patent and Trademark Office; Alexandria, Virginia.
Kazeminezhad, Farzad; Office Action; U.S. Appl. No. 13/605,084; Feb. 2, 2016; United States Patent and Trademark Office; Alexandria, Virginia.

* cited by examiner

SYSTEM AND METHOD FOR PHONETIC SEARCHING OF DATA

CROSS REFERENCE TO RELATED APPLICATION

The present application relates to U.S. application Ser. No. 13/605,084 entitled "A System and Method for Phonetic Searching of Data" (Ref: 512115-US-NP/A181FC) co-filed herewith and which is incorporated herein by reference.

BACKGROUND

1. Technical Field

This invention relates to a system and method for phonetic searching of data.

2. Description of Related Art

Distributed File Systems (DFS) allow access to files from multiple hosts via a computer network. This makes it possible for multiple processors to share files and storage resources and for example to access and process data in parallel. Distributed file systems may include facilities for transparent replication and fault tolerance, that is, when a limited number of nodes in a file system go offline, the system continues to work without any data loss.

DFS are particularly useful for providing access to large data sources particularly for parallel processing and searching and the Hadoop Distributed File System (HDFS) is an example of one such open source DFS.

Hurence Hadoop Audio Miner is a product employed in call centers for performing audio to text transcription of source audio files, typically recordings of client contacts on the Hadoop platform. A Hadoop-based text mining engine is then used to perform searches on behalf of users.

It should be appreciated that in order to make audio files text searchable, significant computational effort is required to generate a textual transcription of the original media files and for large or rapidly increasing bodies of media files, it may not be feasible to provide the processing resources to implement this approach. Even where a transcript is produced, such a transcript contains many incorrectly transcribed words, preventing successful searching. Separately, once text files have been extracted from an audio source, they are typically relatively small and so providing local access to this information to search engines is not critical in providing reasonable performance.

On the hand phonetic searching does not create the same processing demands for indexing files, but local access to indexed information is important for performing phonetic searching.

Nexidia Search GRID provides a REST-based development environment where applications use multiple machines in parallel to provide phonetic searching.

Separately, the Aurix Phonetic Speech Search Engine allows high volumes of recordings to be processed, with less hardware power than with conventional Large Vocabulary Continuous Speech Recognition (LVCSR) systems. The Aurix Engine allows audio to be indexed at high rates with the index files being compressed as they are generated.

Nonetheless, expanding such offerings to deal with large scale media sources continually and possibly rapidly generating media files as well as handling search requests raises problems in: (1) the generation and storage of the index data, (2) the management of the generated index data to accommodate the dynamically changing nature of the target media corpus, and (3) the retrieval of the stored index data on demand for media searching.

SUMMARY

According to one aspect of the present invention there is provided a method of indexing media information for phonetic searching according to claim 1.

In a second aspect there is provided a method of phonetically searching media information according to claim 16.

Further aspects of the invention provide computer program products stored on computer readable storage media which when executed on processors of a distributed multi-processor system are arranged to perform the steps of any one of claims 1 to 13 and 16 to 18.

Still further aspects comprise distributed multi-processor systems arranged to perform the steps of any one of claims 1 to 13 and 16 to 18.

In embodiments of the present invention, the scheduling of indexing tasks ensures that no single indexing task can block a cluster of processors within a distributed file system.

Embodiments of the invention can provide efficient phonetic search (audio mining) of a large corpus of audio material within the constraints imposed by the Hadoop software framework for distributed computation; in particular by aggregating generated index data (searchable phonetic representations of the audio material) into a relatively small number of archive files. The management of the archive files permits dynamic change of the searchable audio corpus; and provides for efficient access to the archive files for audio search.

It will be seen that using a DFS framework can ensure data locality, so that where possible, searching occurs on a cluster node that holds a local copy of a block of index data. The index data within the block can thus be read by the framework in an efficient streaming read operation (possibly skipping over any data for media files which are not included within the search).

BRIEF DESCRIPTION OF THE DRAWINGS

An embodiment of the invention will now be described, by way of example, with reference to the accompanying drawings, in which.

DETAILED DESCRIPTION

Figure 1:
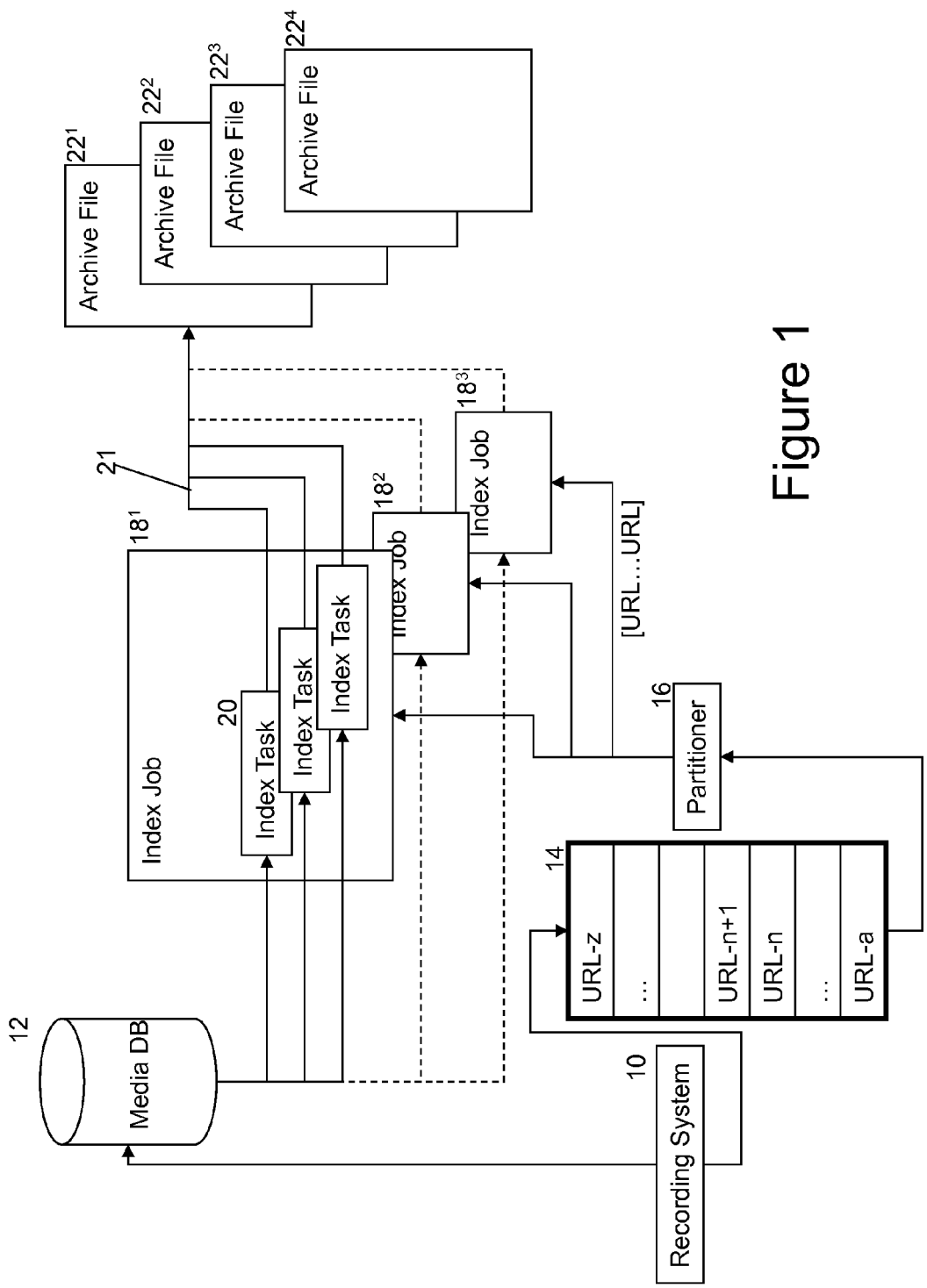
FIG. 1 is a schematic diagram of an indexing portion of a system for indexing media information for phonetic searching according to an embodiment of the invention.

Referring now to the drawings, there are essentially two main components to the phonetic searching system of the preferred embodiment: indexing and searching, each of these being linked through a set of common archive files.

The embodiment is implemented on Hadoop which allows the system to run on a distributed cluster of commodity server hardware which can be easily expanded as required. There are three components of Hadoop of particular relevance in the present case: Hadoop Distributed Filing System (HDFS), Hadoop Map-Reduce Framework (MR) and Hadoop Distributed Database (HBase).

Briefly, HDFS provides an interface to a fault-tolerant distributed filing system that transcends the limitations of any individual machine in a cluster. HDFS is optimized for the storage of a relatively small number of large (i.e. gigabyte to terabyte-scale) files, and for high data read rates via fast sequential streaming read operations, at the expense of latency, i.e. slow seek times to random positions within these files. All files within HDFS are stored as a sequence of blocks, each replicated across a number of cluster nodes in order to provide overall resilience against failure of any individual cluster node. The block size is configurable and while it defaults to 64 MB, in the present embodiment, it is set to 256 MB. Files within HDFS, once created, may not be modified: however they may be deleted, and data may be appended to an existing file.

The MR framework provides for scheduled computation against individual blocks of files stored within HDFS in so far as is possible on a cluster node that contains a local copy of that block, in order to minimise network traffic between cluster nodes. This is particularly useful for audio mining, where the index files contain relatively high amounts of data to be read and so remote access could result in a networking bottleneck.

HBase provides a convenient means of storing the results of audio mining in a form that can be readily accessed.

FIG. 1 shows the operation of the indexing component. A recording system 10 produces media files which are stored in a media database 12. In one implementation, the media files could be programme files produced by a broadcaster or publisher, whereas in other implementations, the media files could be recordings of contacts between clients and agents within a contact center (not shown). In still further implementations, the media files could comprise recordings of video calls; or video recorded events. In the latter cases, it will be appreciated that large numbers of files could be produced at any given time and so the resources involved in processing and searching these files need to be as optimized as possible in order to remain computationally feasible.

In one example, audio tracks are extracted (possibly from an associated video file), transcoded to linear PCM and placed in the external audio database by a single external process operating in tandem with or within the recording system 10. In high volume systems, this could present a significant scalability bottleneck to the ingestion rate of files for indexing. Thus, in such high volume systems, the audio extraction and transcoding processing could be performed in a distributed manner or possibly combined with or incorporated into the indexing jobs described below.

Thus, for the purposes of the present invention, the media database 12 could include any combination of video files, audio files or transcoded audio information.

The recording system 10 produces a list of pointers 14, for example, URLs, to each media file which is to be processed and searchable by the system. The pointers are essentially written to a queue and processed on a FIFO basis.

A partitioning pre-processor 16 grabs a set number of URLs from the front of the pointer queue and partitions this set into a number of subsets, in such a fashion that each subset represents an approximately equal workload; these subsets form the input to a Hadoop MR indexing job 18. (In the current embodiment this partitioning is not itself performed as a distributed computation, but it could be implemented as such). The partitioning determines the way that the overall indexing computation is split between a set of indexing tasks 20 that comprise the indexing job 18. Each task 20 processes one subset of the overall set of URLs. These tasks get scheduled for execution among the nodes of the cluster as free computational resource becomes available.

In the example shown there are 3 indexing jobs $18^1 \ldots 18^3$. The number N of indexing jobs which run concurrently depends on several factors including: the number of concurrent feeds (NF) from which input media files is taken; the "chunk size" (C) into which each feed is broken before being stored, for example, television programmes are typically 1 hour in length; the frequency (FR) with which the system schedules new indexing jobs; and the overall cluster throughput (TP), which is a function of indexing rate per node (hardware dependent) and cluster size (number of nodes). Thus:

$$N = f\left(\frac{NF \cdot FR}{C \cdot TP}\right)$$

A number of these indexing jobs are allowed to run concurrently; thus indexing is not blocked even if one particular indexing job takes a long time to complete. (This can occur if a constituent indexing task represents a disproportionately large amount of the overall computational workload, for example because it contains one or more unusually large files).

Thus, breaking the overall work burden into sufficiently small chunks distributes work efficiently across the cluster, without danger that any one task ends up with a disproportionate share of the load. However, this also improves responsiveness of the system to concurrent search requests described later, ensuring that a cluster does not risk becoming dominated by long-running indexing tasks if there are search requests pending.

Each indexing job 18 instantiates one or more Map tasks 20, each task processing the media files from one of the sets of URLs provided to the job 18 by the partitioner 16. In the simplest implementation, a single task handles the set of media files awaiting ingest, and this may contain multiple URLs. For each URL in the set, the task 20 reads the corresponding source media file and generates a binary index file corresponding to a probabilistic phonetic representation of the audio contents of media file. Each index file 21 is then appended to an archive file 22. Since the process of appending files is inherently serial in nature, it is arranged that concurrently executing indexing tasks append the index files they generate to different archive files, in order that the indexing tasks are able to run in parallel.

As mentioned, a notable point about many DFS systems and Hadoop DFS in particular, is that once data is appended to an archive file, it cannot be modified. This makes the file system particularly useful for the present invention where indexed data is simply appended to an archive file which is then searchable. If the set of archives becomes too large, or if it is required to maintain the amount of searchable media material within a fixed size, as opposed to allowing it to accrue indefinitely, then say for example, archive files of a given age could be removed, appreciating that the media database 12 in respect of the information indexed in that deleted archive file would become unsearchable (phonetically).

Nonetheless, it would still be possible to physically delete index data associated with specific media files, if required. This would require rewriting the containing archive file with the deleted index data excluded, then replacing the old archive file with the updated one and updating the corresponding meta-data. This would be a potentially expensive operation, and would need to be carried out by a periodic maintenance activity that physically removes index data associated with media files that have been logically deleted, somewhat analogous to defragmenting a hard disk. The fact that the index data is distributed across a number of archive files would help, since each archive file typically represents only a proportion of the total, and as the archive files can be maintained individually, there would be no need to take the entire archive offline at any point in time.

The phonetic stream which is produced by the indexing tasks can be of any given format, but essentially it needs to be compatible with the search tasks which will be searching through the indexed information. In one embodiment, the indexing is performed so as to allow search tasks running the Aurix Phonetic Speech Search Engine to search through the indexed information.

Figure 2:
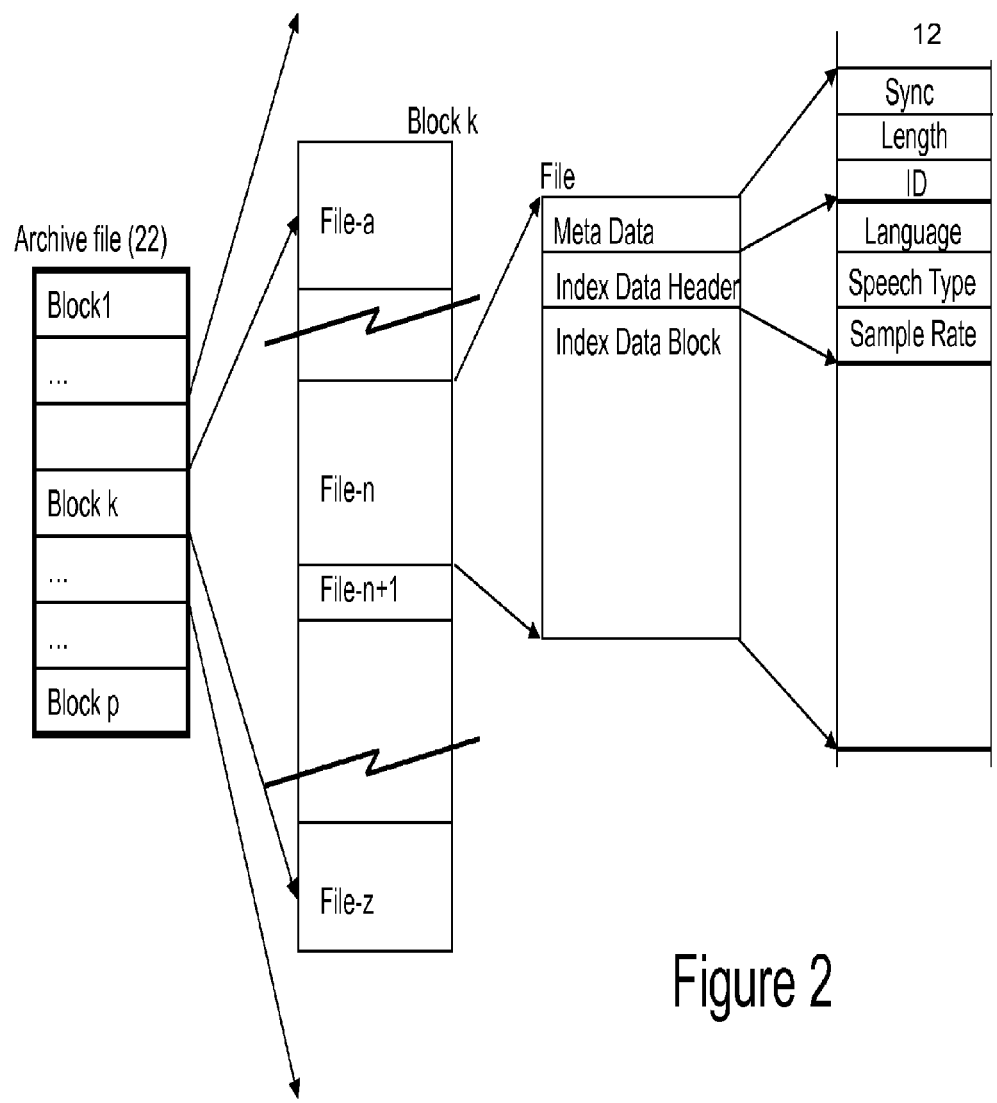
FIG. 2 shows the detail of an archive file produced by the indexing portion of FIG. 1.

FIG. 2 shows the layout of an archive file in more detail. Each file comprises a series of blocks which, as mentioned above, in this case are 256 MB in length. Each block includes index data for a number of media files, typically at least 10. File index data divides into meta data, a data header and then the data extracted from the media itself.

The items shown in the meta-data and index header sections of the record for a given media file show a sync field (essentially a flag comprising a byte sequence that allows the start of an index data record to be validated), an ID field indicating the ID of the media file in the database 12 to which the index data record corresponds, and a length field (a 64-bit record of the length of the index data block). Other meta-data (not shown) includes offsets within the containing archive file for the start and end of the index data associated with a given audio file. The index data header is shown as comprising a record of the audio sample rate and the language and speech type used to generate the audio data. It should also be appreciated that other fields could potentially be added to the meta-data: for example, the number of audio channels. This meta-data could also be stored in a separate database (possibly a HBase), keyed by the audio ID.

Nonetheless, storing this meta-data in the index data record within an archive file 22 improves efficiency during searching, because it eliminates the need to retrieve it from a database.

As mentioned above, distributed file systems and particularly HDFS store data blocks in a redundant fashion and as such any given block of an archive file can be replicated on a number of nodes within a cluster. Search tasks against that block will be preferentially run on one of these nodes that holds a local copy of the block, in order to minimize network traffic. Nonetheless, it will be appreciated that writing indexed information in this format enables efficient searching to be performed by tasks running in parallel across the nodes of a cluster.

It should also be appreciated that in the present implementation, an archive file may contain an incomplete block (at the end), and as indicated in FIG. 2 for File-a and File-z, the boundaries between index data records corresponding to individual media files do not in general correspond to block boundaries. Thus, a (small) minority of index files might be stored across more than one block. As will be explained below, within HDFS, tasks typically run on a processor that has a local copy of a block which it is to access. However, if the task begins searching through an index file which continues to another block, it is still possible for the task to retrieve the index file information from the other block and to continue processing until the end of the of the index file—although its throughput for that particular index file will not be as high as for index files that are read by the task sequentially from a single locally available block.

Although all the index data could in theory be appended into a single archive file, multiple active archive files tend to be more efficient, as appending to a single archive file could represent a performance bottleneck whereas multiple archive files can be appended to concurrently (up to a limit imposed by the number of processing cores and the I/O capacity of the DFS cluster). However, there are also efficiency reasons not to allow the number of archive files to become too large. The data for a given block of an archive file within HDFS can be read from disk in an efficient streaming read operation, rather than requiring individual seeks to the start of each index data file (as would be the case if the index data was stored as individual files). It is therefore best if the archive files are a significant multiple of the block size, rather than being of the order of the block size or less, in order to amortize the proportionately greater cost of processing a part block.

Figure 3:
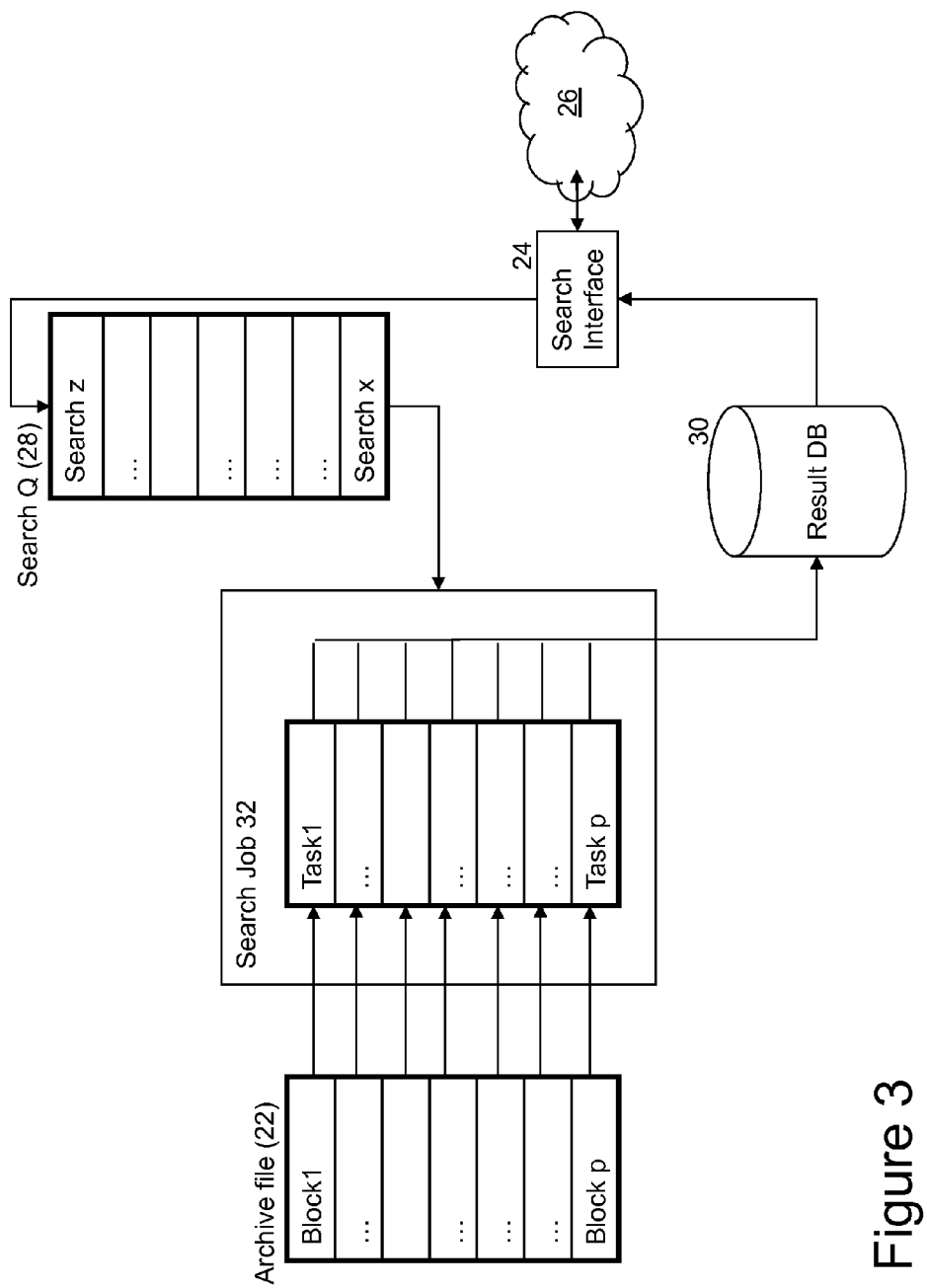
FIG. 3 is a schematic diagram illustrating the operation of a phonetic searching system according to the embodiment of the invention.

Referring now to FIG. 3, a search interface 24 is provided to enable users to submit queries. Typically, such users might be running either a web client or a dedicated search application which generates the query and transmits this across a network 26 to the search interface. Where the query has been input as text, it is converted to a phonetic representation corresponding to the text and compatible with the representation stored within the archive files. Alternatively, the query could be spoken by a user and converted to a phonetic representation in a manner analogous to the operation of the indexing tasks 20. In either case, the conversion can be performed either remotely at the client or by the search interface 24. The interface can run as a Hadoop client submitting searches to a Search Queue 28 where they are handled within the MR framework. It will also be appreciated that the search query can be one of a number of queries expanded from an original single query input by a user as described in U.S. application Ser. No. 13/605,084, filed Sep. 6, 2013, entitled "A System and Method for Phonetic Searching of Data" (Ref: 512115-US-NP/A181FC) co-filed herewith and which is incorporated herein by reference.

Each time a search MR job 32 is instantiated, it instantiates a number of Map Tasks 1 . . . P, each corresponding to a local block of an archive file to be searched. Increasing HDFS block size for the archive files from the default of 64 MB to at least 256 MB as indicated above, ensures that the computational overhead of setting up a search map task is outweighed by the computational effort required to perform the search, even for small searches. The search job 32 looks for searches in a search queue 28 and it passes the search query to each task which has not performed that search on its block i.e. at any given time a task may be performing more than 1 search as it traverses its block. In the embodiment, each task writes its search results to a common HBase database 30 for later retrieval. Once all tasks have reported their results for a given search, the results can be retrieved by the search interface 24 and returned to a client across the network 26—these results typically take the form of a number of links to the original media files along with the detected locations of the search query in those files.

Distributed file systems are replicated across nodes of a cluster and in typical configurations, blocks might be mirrored across three nodes—bearing in mind that any block can be replicated to any given three nodes of a cluster which might in fact comprise a large number of nodes. So for example, the search tasks for given search jobs might be scheduled across a large proportion of the nodes in the cluster.

In FIG. 3, the search job 32 is shown as comprising a set of Tasks 1 . . . P associated with respective blocks of a single archive file, but it will be appreciated that in some implementations, a search job could potentially comprise tasks for all the blocks of a number of archive files. Thus, in some such implementations, a number of concurrently-executing search jobs could each be dedicated to a different subset of the set of archive files 22. Although the scheduler normally prioritizes tasks for jobs according to their position in the job queue, the scheduler also allows a priority to be assigned to each job, and this could be useful. For example, if each archive file contains material accrued within a given time period, searches on archive files containing more recently-ingested material could potentially be given priority over those on archive files containing older material—this could be particularly useful in a contact center implementation.

In the above-described embodiment, the partitioner 16 submits set of a fixed number of URLs to each indexing job. However, it will be seen that if the partitioner were to take into account the size of the media files, partitioning could be handled on the basis of media file size, such that each subset contained approximately the same amount of data.

The invention is not limited to the embodiment(s) described herein but can be amended or modified without departing from the scope of the present invention.

We claim:

1. A multiprocessor-implemented method of indexing media information within a Hadoop framework for phonetic searching, the method comprising:
   providing, within a Hadoop framework of processors, pointers to respective locations of source media files including audio information which is to be made searchable; wherein each pointer corresponds to a respective source media file;
   providing, within the Hadoop framework of processors, a respective set of one or more of the pointers to respective ones of a plurality of Hadoop Map Reduce Framework (MR) jobs,
   wherein each respective set comprises one or more subsets of the one or more of the pointers;
   wherein each MR job instantiates concurrently executing Map tasks, each Map task associated with one of the subsets of the one or more pointers and wherein each Map task:
      processes each of the corresponding source media files corresponding to the associated one of the subsets of the one or more pointers, and
      reads each of the corresponding source media files and generates a respective binary index file corresponding to a probabilistic phonetic stream of audio information for that corresponding source media file;
   appending, within the Hadoop framework of processors, each of the respective binary index files to a respective associated one of a plurality of different archive files; each respective archive file comprising a searchable phonetic representation of the audio information appended thereto; and
   appending, within the Hadoop framework of processors, the respective binary index file of the concurrently executing Map tasks to different ones of the plurality of different archive files in order for the concurrently executing Map tasks to run in parallel using separate processors, said plurality of different archive files stored within a Hadoop distributed filing system (DFS) in which sequential blocks of data comprising each respective archive file are replicated to be locally available to one or more processors from a cluster of processors for sequential reading of said sequential blocks, each block storing a plurality of the respective binary index files, wherein each respective binary index file is formatted to be compatible with search tasks running a phonetic speech search engine.

2. The method according to claim 1 wherein each respective binary index file comprises a header indicating the start of said respective binary index file, an identifier linking said respective binary index file to the corresponding source media file, an indicator of the length of said respective binary index file and its corresponding probabilistic phonetic stream.

3. The method according to claim 2 wherein the header of each respective binary index file further comprises offset indicators indicating start and end locations within the associated one archive file of index information for the corresponding source media file.

4. The method according to claim 2 wherein each respective binary index file further comprises one or more of: an indicator of number of audio channels or a speech type of the corresponding source media file.

5. The method according to claim 1 wherein each of the sequential blocks stores information for at least 10 binary index files.

6. The method according to claim 1 wherein block boundaries within said archive files do not correspond with index file boundaries.

7. The method according to claim 1 wherein said appending comprises appending respective binary index files to respective different archive files in parallel.

8. The method according to claim 1 wherein said source media files comprise recordings of contacts processed by a contact center.

9. The method according to claim 1 wherein said source media files comprise one of television or radio broadcast programmes.

10. A computer program product for execution on processors of a distributed multi-processor system, the computer program product comprising:
   a non-transitory computer readable storage medium having computer readable program code embodied therewith, the computer readable program code comprising:
      computer readable program code configured to provide pointers to respective locations of source media files including audio information which is to be made searchable, wherein each pointer corresponds to a respective source media file;
      computer readable program code configured to provide a respective set of the one or more pointers to respective ones of a plurality of Hadoop Map Reduce Framework (MR) jobs,
      wherein each respective set comprises one or more subsets of the one or more of the pointers;
      wherein each MR job instantiates concurrently executing Map tasks, each Map task associated with one of the subsets of the one or more pointers and wherein each Map task:
         processes each of the corresponding source media files corresponding to the associated one of the subsets of the one or more pointers, and
         reads each of the corresponding source media files and generates a respective binary index file corresponding to a probabilistic phonetic stream of audio information for that corresponding source media file;
      computer readable program code configured to each of the respective binary index files to a respective associated one of a plurality of different archive files; each archive file comprising a searchable phonetic representation of the audio information appended thereto; and computer readable program code configured to append the respective binary index file of the concurrently executing Map tasks to different ones of the plurality of different archive files in order for the concurrently executing Map tasks to run in parallel using separate processors, wherein each respective binary index file is formatted to be compatible with search tasks running a phonetic speech search engine, and wherein each of the plurality of different archive files is stored within a Hadoop distributed filing system (DFS) in which sequential blocks of data comprising each respective archive file are replicated to be locally available to one or more processors from a cluster of processors for sequential reading of said sequential blocks, each block storing a plurality of the respective binary index files.

11. A system comprising:

a distributed multi-processor framework;

a computer readable storage medium accessible by one or more of the processors of the distributed multi-processor framework;

computer executable instructions stored on the computer readable storage media which when executed causes the distributed multi-processor framework to perform:
  providing, within a Hadoop framework of processors, pointers to respective locations of source media files including audio information which is to be made searchable; wherein each pointer corresponds to a respective source media file;
  providing, within the Hadoop framework of processors, a respective set subsets of one or more of the pointers to respective ones of a plurality of Hadoop Map Reduce Framework (MR) jobs,
    wherein each respective set comprises one or more subsets of the one or more of the pointers;
  wherein each MR job instantiates concurrently executing Map tasks, each Map task associated with one of the subsets of the one or more pointers and wherein each Map task:
    processes each of the corresponding source media files corresponding to the associated one of the subsets of the one or more pointers, and
    reads each of the corresponding source media files and generates a respective binary index file corresponding to a probabilistic phonetic stream of audio information for that corresponding source media file;
  appending, within the Hadoop framework of processors, each of the respective binary index files to a respective associated one of a plurality of different archive files; each respective archive file comprising a searchable phonetic representation of the audio information appended thereto; and
  appending, within the Hadoop framework of processors, the respective binary index file of the concurrently executing Map tasks to different ones of the plurality of different archive files in order for the concurrently executing Map tasks to run in parallel using separate processors, said plurality of different archive files stored within a Hadoop distributed filing system (DFS) in which sequential blocks of data comprising each respective archive file are replicated to be locally available to one or more processors from a cluster of processors for sequential reading of said sequential blocks, each block storing a plurality of the respective binary index files, wherein each respective binary index file is formatted to be compatible with search tasks running a phonetic speech search engine.

12. A method of phonetically searching media information within a Hadoop framework of a cluster of processors, the method comprising:
  receiving, within a Hadoop framework of processors, a plurality of search queries from one or more client systems;
  providing, within the Hadoop framework of processors, a phonetic representation of each search query;
  instantiating, within the Hadoop framework of processors, one or more search jobs, each search job comprising a plurality of tasks, each task being arranged to sequentially read a block from an archive file, said archive file stored within a Hadoop distributed filing system (DFS) in which sequential blocks of data comprising said archive file are replicated to be locally available to one or more processors from the cluster of processors for executing said tasks, each block storing an aggregation of index files corresponding to a plurality of source media files, the index files being derived from Hadoop Map Reduce Framework (MR) jobs;
  storing, within the Hadoop framework of processors, the index files of concurrently executing tasks in different archive files in order for the concurrently executing tasks to run in parallel using separate processors, each index file containing a probabilistic phonetic stream corresponding to audio information for a given source media file, wherein the aggregation of index files in each block provides a searchable phonetic representation of the audio information, wherein the index files are formatted to be compatible with search tasks running a phonetic speech search engine;
  for each task, obtaining phonetic representations of outstanding search queries for a block and sequentially searching said block for each outstanding search query; and
  responsive to matching one of the outstanding search queries with a location within said phonetic stream for an index file, returning, within a Hadoop framework of processors, said location and an identifier of said source media file for responding to said one of the outstanding search queries.

13. A method according to claim 12 wherein said returning comprises writing said location and said identifier to a distributed database.

14. The method according to claim 12 wherein said source media files comprise at least one of recordings of contacts processed by a contact center; one of television or radio broadcast programmes; recordings of video calls; or video recorded events.

15. A computer program product for execution on a cluster of processors, the computer program product comprising is arranged to perform the steps of:
  a non-transitory computer readable storage medium having computer readable program code embodied therewith, the computer readable program code comprising:
  computer readable program code configured to receive a plurality of search queries from one or more client systems;
  computer readable program code configured to provide a phonetic representation of each search query;
  computer readable program code configured to instantiate one or more search jobs, each search job comprising a plurality of tasks, each task being arranged to sequentially read a block from an archive file, said archive file stored within a Hadoop distributed filing system (DFS)

in which sequential blocks of data comprising said archive file are replicated to be locally available to one or more processors from the cluster of processors for executing said tasks, each block storing an aggregation of index files corresponding to a plurality of source media files, the index files being derived from Hadoop Map Reduce Framework (MR) jobs;

computer readable program code configured to store the index files of concurrently executing tasks in different archive files in order for the concurrently executing tasks to run in parallel using separate processors, each index file containing a probabilistic phonetic stream corresponding to audio information for a given source media file, wherein the aggregation of index files in each block provides a searchable phonetic representation of the audio information, and wherein the index files are formatted to be compatible with search tasks running a phonetic speech search engine;

computer readable program code configured to, for each task, obtain phonetic representations of outstanding search queries for a block and sequentially search said block for each outstanding search query; and computer readable program code configured to, responsive to matching one of the outstanding search queries with a location within said phonetic stream for an index file, return said location and an identifier of said source media file for responding to said one of the outstanding search queries.

16. A system comprising:

a distributed multi-processor framework;

a computer readable storage medium accessible by one or more of the processors of the distributed multiprocessor framework;

computer executable instructions stored on the computer readable storage media which when executed causes the distributed multi-processor framework to perform:

receiving a plurality of search queries from one or more client systems;

providing a phonetic representation of each search query;

instantiating one or more search jobs, each search job comprising a plurality of tasks, each task being arranged to sequentially read a block from an archive file, said archive file stored within a Hadoop distributed filing system (DFS) in which sequential blocks of data comprising said archive file are replicated to be locally available to one or more processors from the distributed multi-processor framework for executing said tasks, each block storing an aggregation of index files corresponding to a plurality of source media files, the index files being derived from Hadoop Map Reduce Framework (MR) jobs, wherein the index files are formatted to be compatible with search tasks running a phonetic speech search engine;

storing the index files of concurrently executing tasks in different archive files in order for the concurrently executing indexing tasks to run in parallel using separate processors, each index file containing a probabilistic phonetic stream corresponding to audio information for a given source media file, wherein the aggregation of index files in each block provides a searchable phonetic representation of the audio information;

for each task, obtaining phonetic representations of outstanding search queries for a block and sequentially searching said block for each outstanding search query; and responsive to matching one of the outstanding search queries a with a location within said phonetic stream for an index file, returning said location and an identifier of said source media file for responding to said one of the outstanding search queries.

* * * * *